ns in a first fluidized bed reactor and a mixture comprising ethylene and one or more alpha-olefins in a second fluidized bed reactor, the first and second reactors being connected in series, said catalyst comprising:

United States Patent [19]

Daniell et al.

[11] Patent Number: 5,371,145
[45] Date of Patent: Dec. 6, 1994

[54] HIGH DENSITY, HIGH MOLECULAR WEIGHT POLYETHYLENE

[75] Inventors: Paul T. Daniell, Cross Lanes, W. Va.; William D. Heitz, Flagtown, N.J.; Thomas E. Spriggs, Cross Lanes; Thomas J. McNeil, Hurricane, both of W. Va.; Kevin J. Cann, Rocky Hill, N.J.

[73] Assignee: Union Carbide Chemicals & Plastics Technology Corporation, Danbury, Conn.

[21] Appl. No.: 73,173

[22] Filed: Jun. 8, 1993

[51] Int. Cl.$^5$ .................. C08L 23/04; C08L 23/18
[52] U.S. Cl. ......................... 525/240; 525/320; 525/322; 525/324
[58] Field of Search ............. 525/240, 322, 324, 320

[56] References Cited

U.S. PATENT DOCUMENTS

| | | | |
|---|---|---|---|
| 3,179,719 | 4/1965 | Cines | 525/240 |
| 3,280,220 | 10/1966 | Nelson | 525/240 |
| 4,508,842 | 4/1985 | Beran et al. | 502/112 |
| 4,550,143 | 10/1985 | Tanaka et al. | 525/240 |
| 4,617,352 | 10/1986 | Page et al. | 525/240 |
| 4,859,749 | 8/1989 | Franke | 526/124 |
| 5,047,468 | 9/1991 | Lee et al. | 525/53 |

FOREIGN PATENT DOCUMENTS

| | | |
|---|---|---|
| 59-084942 | 5/1984 | Japan . |
| 60-026050 | 2/1985 | Japan . |
| 61-009446 | 1/1986 | Japan . |
| 62-020543 | 1/1987 | Japan . |

OTHER PUBLICATIONS

Kaufman—SPE Textbook—p. 182—1986.

Primary Examiner—Carman J. Seccuro, Jr.
Attorney, Agent, or Firm—Saul R. Bresch

[57] ABSTRACT

A process comprising continuously contacting with a catalyst, under polymerization conditions, ethylene or a mixture comprising ethylene and one or more alpha-olefins in a first fluidized bed reactor and a mixture comprising ethylene and one or more alpha-olefins in a second fluidized bed reactor, the first and second reactors being connected in series, said catalyst comprising:

(A) a catalyst precursor comprising:
(i) a vanadium compound, which is the reaction product of
(a) $VX_3$ wherein each X is independently chlorine, bromine, or iodine; and
(b) an electron donor, which is a liquid, organic Lewis base in which $VX_3$ is soluble;
(ii) a modifier having the formula $BX_3$ or $AlR_{(3-a)}$ wherein each X is as defined above; each R is independently alkyl having 1 to 14 carbon atoms; and a is 1 or 2; and
(iii) a silica or alumina support for said vanadium compound and modifier;
(B) a cocatalyst having the formula $AlR_3$ wherein R is as defined above; and
(C) a promoter having the formula $R'_bCX'_{(4-b)}$ wherein R' is hydrogen or an unsubstituted or halo substituted alkyl having 1 to 6 carbon atoms; X' is a halogen; and b is 0, 1, or 2, wherein, in the first reactor,
a homopolymer or copolymer is made having a relatively high melt index in the range of about 1 to about 100 grams per 10 minutes; a density of at least 0.950 gram per cubic centimeter; and a melt flow ratio in the range of about 50 to about 100; and in the second reactor,
a copolymer is made having a relatively low melt index in the range of about 0.001 to about 0.01 gram per 10 minutes; a density of at least 0.925 gram per cubic centimeter; and a melt flow ratio in the range of about 50 to about 100,
wherein, in the second reactor, the first reactor homopolymer or copolymer and the second reactor copolymer are blended in situ.

4 Claims, No Drawings

HIGH DENSITY, HIGH MOLECULAR WEIGHT POLYETHYLENE

TECHNICAL FIELD

This invention relates to a process for the manufacture of an enhanced high density, high molecular weight polyethylene.

BACKGROUND INVENTION

There is a demand for high density high molecular weight polyethylene film for various applications such as industrial can liners, merchandise bags, and grocery sacks. Unfortunately, the resin available to provide this film requires a relatively high amount of power in order to extrude the resin into a commercially acceptable film. Further, the resulting film does not have the high impact strength, which is so important for the aforementioned applications.

DISCLOSURE OF THE INVENTION

An object of this invention is to provide a process for the manufacture of a high density, high molecular weight polyethylene, which will require relatively less power to extrude into film, and will yield a film of higher impact strength than the resins presently available for the applications referred to above.

Other objects and advantages will become apparent hereinafter.

According to the present invention, such a process has been discovered comprising continuously contacting with a catalyst, under polymerization conditions, ethylene or a mixture comprising ethylene and one or more alpha-olefins in a first fluidized bed reactor and a mixture comprising ethylene and one or more alpha-olefins in a second fluidized bed reactor, the first and second reactors being connected in series, said catalyst comprising:

(A) a catalyst precursor comprising:
   (i) a vanadium compound, which is the reaction product of
      (a) VX3 wherein each X is independently chlorine, bromine, or iodine; and
      (b) an electron donor, which is a liquid, organic Lewis base in which VX3 is soluble;
   (ii) as a modifier, either BX3 or $AlX_aR_{(3-a)}$ wherein each X is as defined above; each R is independently alkyl having 1 to 14 carbon atoms; and a is 1 or 2; and
   (iii) a silica or alumina support for said vanadium compound and modifier;
(B) a cocatalyst having the formula AlR3 wherein R is as defined above; and
(C) a promoter having the formula $R'_bCX'_{(4-b)}$ wherein R' is hydrogen or an unsubstituted or halo substituted alkyl having 1 to 6 carbon atoms; X' is a halogen; and b is 0, 1, or 2, wherein, in the first reactor,
   (1) optionally, alpha-olefin is present in a ratio of about 0.002 to about 0.01 mole of alpha-olefin per mole of ethylene; and
   (2) hydrogen is present in a ratio of about 0.05 to about 0.15 mole of hydrogen per mole of ethylene
   to produce a homopolymer or copolymer having a relatively high melt index in the range of about 1 to about 100 grams per 10 minutes; a density of at least 0.950 gram per cubic centimeter; and a melt flow ratio in the range of about 50 to about 100; and
(3) the said polymer is admixed with active catalyst and the mixture is transferred to the second reactor wherein:
   (1) said alpha-olefin is present in a ratio of about 0.005 to about 0.03 mole of alpha-olefin per mole of ethylene;
   (2) hydrogen is present in a ratio of about 0.002 to about 0.02 mole of hydrogen per mole of ethylene;
   (3) additional cocatalyst, as defined above, is introduced into the second reactor in an amount sufficient to restore the activity of the catalyst transferred from the first reactor
      to produce a copolymer having a relatively low melt index in the range of about 0.001 to about 0.01 gram per 10 minutes; a density of at least 0.925 gram per cubic centimeter; and a melt flow ratio in the range of about 50 to about 100 with the said relatively high melt index polymer produced in said first reactor in intimate admixture therewith.

DESCRIPTION OF THE PREFERRED EMBODIMENTS(S)

The vanadium based catalyst and a process for preparing same are described in U.S. Pat. 4,508,842. The preferred vanadium trihalide (VX3) is vanadium trichloride. The electron donor is a liquid, organic Lewis base in which the vanadium trihalide is soluble. It is, generally, liquid at temperatures in the range of about 0° C. to about 200° C.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic adds having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

The modifier has the formula BX3 or $AlX_aR_{(3-a)}$ wherein each X is independently chlorine, bromine, or iodine; each R is independently alkyl having 1 to 14 carbon atoms; and a is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to vanadium can be in the range of about 1:1 to about 10:1 and is preferably in the range of about 2:1 to about 5:1.

The promoter has the formula $R'bCX'_{(4-b)}$ wherein $R'$ is hydrogen or an unsubstituted or halosubstituted alkyl having 1 to 6 carbon atoms; $X'$ is a halogen; and b is 0, 1, or 2.

Preferred promoters include fluoro-, chloro-, and bromosubstituted methane and ethane wherein there are at least two X atoms, e.g., methylene dichloride, 1,1,1-trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The cocatalyst has the formula $AlR_3$ wherein each R is independently alkyl having 1 to 14 carbon atoms.

Examples of preferred halogen containing modifiers are dibutylaluminum chloride, diethylaluminum chloride, and ethylaluminum sesquichloride.

Examples of hydrocarbyl modifiers and cocatalysts are as follows: triisobutylaluminum, trihexylaluminum, di-isobutylhexylaluminum, isobutyl dihexyl-aluminum, trimethylaluminum, triethylaluminum, tripropylaluminum, triisopropylaluminum, tri-n-butylaluminum, trioctylaluminum, tridecylaluminum, and tridodecylaluminum. Preferred cocatalysts are triethylaluminum, triisobutylaluminum, and trihexylaluminum.

The support can be silica or alumina; however, silica is preferred. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support is accomplished by mixing the precursor and silica gel in the electron donor solvent or other solvent followed by solvent removal under reduced pressure.

The modifier is usually dissolved in an organic solvent such as isopentane and impregnated into the support following impregnation of the precursor, after which the supported catalyst precursor is dried. The cocatalyst and promoter are preferably added separately neat or as solutions in an inert solvent, such as isopentane, to the polymerization reactor at the same time as the flow of ethylene is initiated.

Useful molar ratios for the vanadium based catalyst are about as follows:

|  | Broad | Preferred |
| --- | --- | --- |
| electron donor:V | 1:1 to 20:1 | 1:1 to 10:1 |
| modifier:V | 1:1 to 10:1 | 2:1 to 5:1 |

The entire catalyst, which includes the supported precursor and modifier, the cocatalyst, and the promoter, are added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is conducted in the gas phase using a continuous fluidized process. A typical fluidized bed reactor is described in U.S. Pat. No. 4,482,687.

A relatively high melt index (or low molecular weight) homopolymer or copolymer is prepared in the first reactor. The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium.

The high melt index can be in the range of about 1 to about 100 grams per 10 minutes, and is preferably in the range of about 8 to about 12 grams per 10 minutes. The molecular weight of the high melt index polymer is, generally, in the range of about 80,000 to about 150,000. The density of the copolymer prepared in the first reactor is at least 0.950 gram per cubic centimeter, and is preferably in the range of 0.953 to 0.958 gram per cubic centimeter. The melt flow ratio of the first reactor polymer is in the range of about 50 to about 100, and is preferably about 60 to about 70.

Melt index is determined under ASTM D-1238, Condition E. It is measured at 190° C. and 2.16 kilograms and reported as grams per 10 minutes.

Melt flow ratio is the ratio of flow index to melt index. Flow index is determined under ASTM D-1238, Condition F. It is measured at 190° C. and 10 times the weight used in determining the melt index.

A relatively low melt index (or high molecular weight) copolymer is prepared in the second reactor. The low melt index can be in the range of about 0.001 to about 0.01 gram per 10 minutes, and is preferably in the range of about 0.003 to about 0.005 gram per 10 minutes. The molecular weight of the low melt index copolymer is, generally, in the range of about 400,000 to about 650,000. The density of the copolymer prepared in the second reactor is at least 0.925 gram per cubic centimeter, and is preferably in the range of 0.933 to 0.937 gram per cubic centimeter. The melt flow ratio of the second reactor copolymer is in the range of about 50 to about 100, and is preferably about 70 to about 85.

The blend or final product, as removed from the second reactor, can have a flow index in the range of about 6 to about 10 grams per 10 minutes, and preferably has a flow index in the range of about 7 to about 9 grams per 10 minutes. The molecular weight of the final product is, generally, in the range of about 320,000 to about 420,000. The density of the blend is at least 0.940 gram per cubic centimeter, and is preferably in the range of 0.944 to 0.948 gram per cubic centimeter.

The blend has a broad molecular weight distribution with a long high molecular weight tail. The broad molecular weight distribution is reflected in an Mw/Mn ratio of about 22 to about 28, preferably about 24 to about 27. Mw is the weight average molecular weight; Mn is the number average molecular weight; and the Mw/Mn ratio can be referred to as polydispersity, which is a measure of the breadth of the molecular weight distribution. In the long high molecular weight tail, there can be a concentration of high molecular weight species greater than about 500,000 Daltons, preferably greater than about 550,000 Daltons.

The weight ratio of homopolymer or copolymer prepared in the first reactor to copolymer prepared in the second reactor can be in the range of about 0.5:1 to about 2:1 and is preferably in the range of about 1.1:1 to about 0.9:1. The optimum weight ratio is about 1:1.

The vanadium-based catalyst, ethylene, alpha-olefin(s), if any, and hydrogen are continuously fed into the first reactor; the polymer/catalyst mixture is continuously transferred from the first reactor to the second reactor; ethylene, alpha-olefin(s), and hydrogen, as well as cocatalyst are continuously fed to the second reactor. The final product is continuously removed from the second reactor.

The alpha-olefin can have 3 to 12 carbon atoms and preferably has 3 to 8 carbon atoms. Examples of suitable alphaolefins are propylene, 1-butene, 1-hexene, 4-methyl-1-pentene, and 1-octene. A preferred alpha-olefin is 1-hexene. In addition to ethylene and one alpha-olefin, additional alpha-olefins can be utilized in the process, if desired, provided that the total amount of additional alpha-olefins is no greater than about 15 percent by weight based on the combined weight of the ethylene and the initial alpha-olefin, preferably in the range of about 1 to about 10 percent by weight. Insofar as mole ratios of initial alpha-olefin to ethylene are concerned, the molar amount of additional alphaolefin is considered to be part of the moles of the initial alphaolefin, i.e., the mole ratio of alpha-olefin to ethylene means the mole ratio of total alpha-olefin to ethylene.

In the high melt index (first) reactor:

The mole ratio of alpha-olefin to ethylene can be in the range of up to about 0.01:1, and, if alpha-olefin is used, is preferably in the range of about 0.002:1 to about 0.003:1. It should be pointed out here that it is not necessary to use an alpha-olefin in the first reactor. This would be the case where it is desired to make a homopolymer of ethylene in this reactor. The mole ratio of hydrogen to ethylene can be in the range of about 0.05:1 to about 0.15:1, and is preferably in the range of about 0.11:1 to about 0,12:1. The operating temperature is generally in the range of about 90° to about 100° C. Preferred operating temperatures vary depending on the density desired, i.e., lower temperatures for lower densities and higher temperatures for higher densities.

In the low melt index (second) reactor:

The mole ratio of alpha-olefin to ethylene can be in the range of about 0.005:1 to about 0.03:1, and is preferably in the range of about 0.011:1 to about 0.0 12: 1. The mole ratio of hydrogen to ethylene can be in the range of about 0.002:1 to about 0.02:1, and is preferably in the range of about 0.006:1 to about 0.007:1. The operating temperature is generally in the range of about 90° to about 100° C. As mentioned above, the temperature is preferably varied with the desired density.

The pressure is generally the same in both the first and second reactors. The pressure can be in the range of about 200 to about 400 psi and is preferably in the range of about 280 to about 320 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

Advantages of the process of the invention are given in terms of the film produced from the copolymer blend, i.e., the final product of the process. The film has a higher impact strength than the film produced from comparable commercial resins both at 0.5 mil and 1.0 mil thicknesses. Also, the extrusion characteristics are superior to these same commercial resins in terms of power requirements (drive amps) at a given throughput rate, melt pressure, and bubble stability.

Patents mentioned in this specification are incorporated by reference herein.

The invention is illustrated by the following examples.

EXAMPLE 1

The catalyst is prepared as follows:

To a reactor containing 3 liters of anhydrous tetrahydrofuran (THF) are added 42 grams (0.27 mole) of VCl3. The mixture is stirred for 2 hours at 70° C. under a nitrogen blanket until the VCl3 dissolves. To this solution are added 800 grams of silica (dehydrated by heating to 600° C.), and stirring is continued for 1 hour at 70° C. The reactor is vented and the solution is dried to the mud stage at 85° C. The drying is continued under nitrogen until a 4 to 10 percent by weight THF level is reached in the resulting precursor. The vanadium complex so produced is a free flowing solid containing 0.29 millimole of vanadium per gram of vanadium complex. The solid is removed form the reactor and stored under nitrogen.

The modifier is introduced using the following procedure. To a reactor containing 1.5 liters of anhydrous isopentane are added 500 grams of the supported vanadium complex prepared above. To this mixture is added, with stirring, a 25 weight percent solution of diethylaluminum chloride (DEAC), as modifier, in anhydrous hexene. The DEAC is employed in an amount sufficient to provide 0.5 mole of aluminum per mole of THF in the vanadium complex. The mixture is heated to 55° C. and purged with nitrogen for 3 hours or until the product is a free flowing powder. The vanadium precursor so produced is removed from the reactor and stored under nitrogen.

Polyethylene is produced using the following standard procedure, under the operating conditions set forth in the Table. Ethylene is copolymerized with 1-hexene. Triethylaluminum (TEAL) cocatalyst is added during polymerization as a 20 weight percent solution in isopentane. Chloroform (CHCl3) is added as a promoter as a 20 weight percent solution in isopentane in proportion to the cocatalyst.

Each polymerization is continuously conducted after equilibrium is reached under conditions set forth in the Table.

Polymerization is initiated in the first reactor by continuously feeding the above catalyst precursor, cocatalyst triethylaluminum (TEAL), and promoter (chloroform/2.5 percent by weight in isopentane) into a fluidized bed of polyethylene granules together with ethylene, 1-hexene, and hydrogen. The TEAL is first dissolved in isopentane (2.5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene, and hydrogen are introduced into the second reactor where they come into contact with the copolymer and catalyst from the first reactor. Additional cocatalyst is also introduced. Copolymer product is continuously removed.

TABLE

|  | Reactor 1 | Reactor 2 | Final Product |
|---|---|---|---|
| Operating Conditions | | | |
| hydrogen/ethylene mole ratio | 0.112 | 0.0065 | — |
| temperature (°C.) | 95 | 95 | — |
| ethylene partial pressure (psi) | 180 | 180 | — |
| total pressure (psia) | 314 | 314 | — |
| 1-hexene/ethylene mole ratio | 0.0024 | 0.0115 | — |
| nitrogen (mol %) | 33 | 37.5 | — |
| production rate (lbs/hr) | 18.2 | 16.1 | — |
| fluidized bed volume (cubic ft) | 6.2 | 8.78 | — |
| space/time/yield (lbs/hr/cu ft) | 2.93 | 1.83 | — |
| residence time (hours) | 6.59 | 4.46 | — |
| cocatalyst feed rate (cc/hr) | 200 | 225 | — |
| weight % of final | | | |
| weight % of final product | 53 | 47 | — |
| bed weight (lbs) | 120 | 160 | — |
| promoter feed rate (cc/hr) | 175 | 200 | — |
| Resin Properties | | | |
| melt index (g/10 min.) | 11.63 | — | 0.28 |
| flow index (g/10 min.) | — | 0.5 | 7.96 |
| melt flow ratio | — | — | 28.4 |
| density (g/cc) | 0.958 | 0.936 | 0.946 |
| ash (wt %) | 0.050 | — | 0.035 |
| bulk density (lbs/cu ft) | 27.6 | 20.76 | 26.02 |
| average particle size (inch) | 0.0242 | 0.0416 | 0.033 |
| fines thru 120 mesh (wt %) | 4.36 | — | 1.4 |
| residual vanadium (ppm) | 5.68 | 4.07 | 3.08 |

Notes to Table:
1. Resin Properties for Reactor 2 - the values are based on the assumption that the Reactor 2 copolymer is produced independently.
2. Nitrogen (mol %) is the mol % nitrogen based on the total moles of ethylene, 1-hexene, hydrogen, and nitrogen.

EXAMPLE 2

The final product of Example 1 is extruded into two films, one having a thickness of 0.5 mil and the other having a thickness of 1.0 mil.

The extruder and the extrusion conditions are described as follows: A 50 millimeter Alpine ™ film extruder with an 80 millimeter die and a 1.0 millimeter die gap is used. The film is extruded at a 204° C. melt temperature; a 4:1 blow-up ratio; and a 38 inch frost line height.

Two high density, high molecular weight commercially available polyethylenes (comonomer: 1-hexene) are extruded into films in the same manner as the final product of Example 1 except that Resin B is extruded into a film having a thickness of 0.7 mil instead of one having a thickness of 1.0 mil.

The two resins have the following properties:

| Resin Properties | Resin A | Resin B |
|---|---|---|
| melt index (g/10 min) | 0.27 | 0.25 |
| flow index (g/10 min) | 8.5 | 8.0 |
| melt flow ratio | 32 | 32 |
| density (g/cc) | 0.950 | 0.949 |
| ash (wt %) | 0.037 | 0.042 |

The extrusion characteristics of the Example 1 product and Resin A are as follow:

| Extrusion Characteristics | Example 1 product | Resin A |
|---|---|---|
| Bubble Stability | Excellent | Fair |
| Drive Amps | 56.9 | 57.1 |
| Melt Pressure (psia) | 5200 | 5900 |
| Throughput Rate (lbs/hr) | 85 | 79 |

The impact strengths of the films are as follows (impact strength in inch-pounds is determined under ASTM D-1709):

|  | Mils | | |
|---|---|---|---|
|  | 1.0 | 0.7 | 0.5 |
| Example 1 product | 450 | — | 394 |
| Resin A | 225 | — | 330 |
| Resin B | — | 400 | 308 |

We claim:
1. A blend of polymers comprising a homopolymer of ethylene or a copolymer of ethylene and one or more alpha-olefins having a relatively high melt index and a copolymer of ethylene and one or more alpha-olefins having a relatively low melt index, said blend having a flow index in the range of about 6 to about 10 grams per 10 minutes; a density in the range of 0.940 to 0.950 gram per cubic centimeter; an Mw/Mn ratio in the range of about 22 to about 28; and a long high molecular weight tail having a concentration of high molecular weight species greater than about 500,000 Daltons prepared by a process comprising continuously contacting with a catalyst, under polymerization conditions, ethylene or a mixture comprising ethylene and one or more alpha-olefins in a first fluidized bed reactor and a mixture comprising ethylene and one or more alpha-olefins in a second fluidized bed reactor, the first and second reactors being connected in series, said catalyst comprising:
  (A) a catalyst precursor comprising:
    (i) a vanadium compound, which is the reaction product of
      (a) VX3 wherein each X is independently chlorine, bromine, or iodine; and
      (b) an electron donor, which is a liquid, organic Lewis base in which VX3 is soluble;
    (ii) as a modifier, either BX3 or $AlX_aR_{(3-a)}$ wherein each X is as defined above; each R is independently alkyl having 1 to 14 carbon atoms; and a is 1 or 2; and
    (iii) a silica or alumina support for said vanadium compound and modifier;

(B) a cocatalyst having the formula AlR3 wherein R is as defined above; and (C) a promoter having the formula $R'_b CX'_{(4-b)}$ wherein $R'$ is hydrogen or an unsubstituted or halo substituted alkyl having 1 to 6 carbon atoms; $X'$ is a halogen; and b is 0, 1, or 2, wherein, in the first reactor, (1) optionally, alpha-olefin is present in a ratio of about 0.002 to about 0.01 mole of alpha-olefin per mole of ethylene; and (2) hydrogen is present in a ratio of about 0.05 to about 0.15 mole of hydrogen per mole of ethylene to produce a homopolymer or copolymer having a relatively high melt index with a molecular weight of about 80,000 to about 150,000; a density of at least 0.950 gram per cubic centimeter; and a melt flow ratio in the range of about 50 to about 100; and (3) the said polymer is admixed with active catalyst and the mixture is transferred to the second reactor wherein:

(1) said alpha-olefin is present in a ratio of about 0.005 to about 0.03 mole of alpha-olefin per mole of ethylene;

(2) hydrogen is present in a ratio of about 0.002 to about 0.02 mole of hydrogen per mole of ethylene;

(3) additional cocatalyst, as defined above, is introduced into the second reactor in an amount sufficient to restore the activity of the catalyst transferred from the first reactor to produce a copolymer having a relatively low melt index in the range of about 0.001 to about 0.01 gram per 10 minutes; a density of at least 0.925 to 0.937 gram per cubic centimeter; and a melt flow ratio in the range of about 50 to about 100 with the said relatively high melt index polymer produced in said first reactor in intimate admixture therewith.

2. The blend defined in claim 1 wherein the alpha-olefins have 3 to 8 carbon atoms.

3. The blend defined in claim 1 wherein VX3 is VCl3; the electron donor is tetrahydrofuran; the modifier is diethylaluminum chloride; the cocatalyst is triethylaluminum; and the promoter is chloroform.

4. A blend of polymers comprising a copolymer of ethylene and one or more alpha-olefins having 3 to 8 carbon atoms having a relatively high melt index and a copolymer of ethylene and one or more alpha-olefins having 3 to 8 carbon atoms having a relatively low melt index, said blend having a flow index in the range of about 7 to about 9 grams per 10 minutes; a density in the range of 0.944 to 0.948 gram per cubic centimeter; an Mw/Mn ratio in the range of about 24 to about 27; and a long high molecular weight tail having a concentration of high molecular weight species greater than about 550,000 Daltons prepared by a process comprising continuously contacting with a catalyst, under polymerization conditions, a mixture comprising ethylene and one or more alpha-olefins having 3 to 8 carbon atoms in a first fluidized bed reactor and a mixture comprising ethylene and one or more alpha-olefins having 3 to 8 carbon atoms in a second fluidized bed reactor, the first and second reactors being connected in series, said catalyst comprising:

(A) a catalyst precursor comprising:
(i) a vanadium compound, which is the reaction product of VCl3 and tetrahydrofuran;
(ii) a modifier, which is diethylaluminum chloride; and
(iii) a silica support for said vanadium compound and modifier;

(B) a cocatalyst, which is triethylaluminum; and (C) a promoter, which is chloroform, wherein, in the first reactor, (1) alpha-olefin is present in a ratio of about 0.002 to about 0.003 mole of alpha-olefin per mole of ethylene; and (2) hydrogen is present in a ratio of about 0.11 to about 0.12 mole of hydrogen per mole of ethylene to produce a copolymer having a relatively high melt index in the range of about 8 to about 12 grams per 10 minutes; a density in the range of 0.953 to 0.958 gram per cubic centimeter; and a melt flow ratio in the range of about 60 to about 70; and (3) the said polymer is admixed with active catalyst and the mixture is transferred to the second reactor wherein:

(1) said alpha-olefin is present in a ratio of about 0.011 to about 0.012 mole of alpha-olefin per mole of ethylene;

(2) hydrogen is present in a ratio of about 0.006 to about 0.007 mole of hydrogen per mole of ethylene;

(3) additional cocatalyst, as defined above, is introduced into the second reactor in an amount sufficient to restore the activity of the catalyst transferred from the first reactor to produce a copolymer having a relatively low melt index in the range of about 0.003 to about 0.005 gram per 10 minutes; a density in the range of 0.933 to 0.937 gram per cubic centimeter; and a melt flow ratio in the range of about 70 to about 85 with the said relatively high melt index polymer produced in said first reactor in intimate admixture therewith.

* * * * *